United States Patent [19]

Reginaldo

[11] Patent Number: 4,805,944
[45] Date of Patent: Feb. 21, 1989

[54] BEADED TUBE COUPLING WITH END SEAL RING

[75] Inventor: Alberto N. Reginaldo, Rochester Hills, Mich.

[73] Assignee: General Motors Corporation, Detroit, Mich.

[21] Appl. No.: 204,472

[22] Filed: Jun. 9, 1988

[51] Int. Cl.⁴ .............................................. F16L 25/00
[52] U.S. Cl. ................................... 285/331; 285/351; 285/354
[58] Field of Search ............... 285/354, 353, 351, 331, 285/350, 334.4

[56] References Cited

U.S. PATENT DOCUMENTS

| | | | |
|---|---|---|---|
| 2,458,817 | 1/1949 | Wolfram | 285/354 |
| 2,463,883 | 3/1949 | Kinsey | 285/354 X |
| 3,092,404 | 6/1963 | MacWilliam | 285/350 X |
| 3,393,930 | 7/1968 | Ziheral et al. | 285/354 X |

FOREIGN PATENT DOCUMENTS 487796  6/1938  United Kingdom ............... 285/354

Primary Examiner—Dave W. Arola
Attorney, Agent, or Firm—R. L. Phillips

[57] ABSTRACT

A tube coupling having a ring seal with a U-shaped cross section that is encapsulated in a socket member when engaged and compressed by the free plug end of a tube and sealingly contacts the end of the tube at the radial end surface and inner and outer diameter wall surfaces thereof and also three surrounding surfaces of the socket member.

2 Claims, 1 Drawing Sheet

U.S. Patent     Feb. 21, 1989     4,805,944
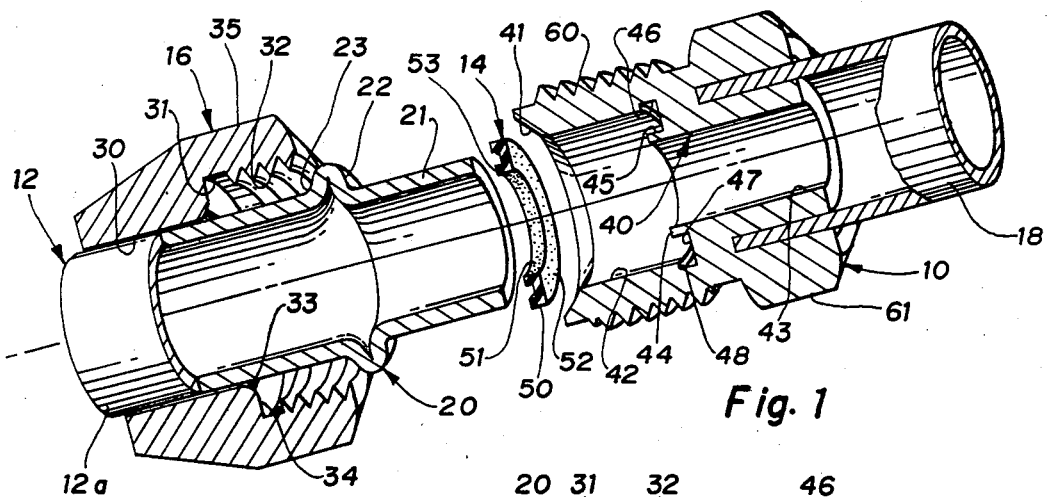
Fig. 1
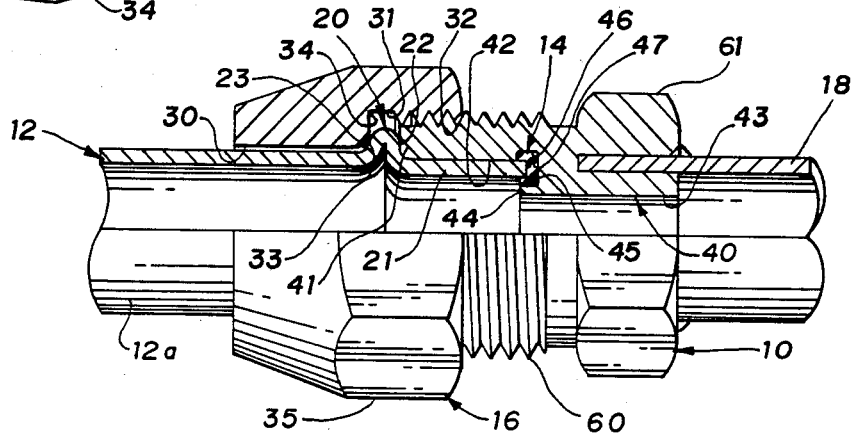
Fig. 2
Fig. 3
Fig. 4
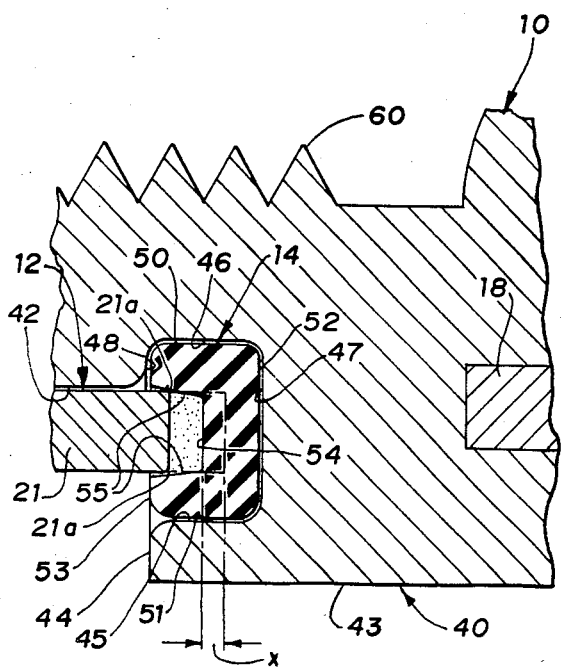
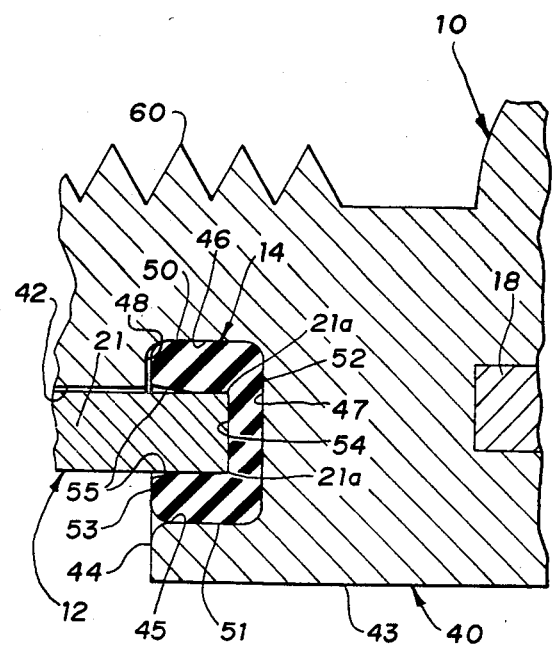

BEADED TUBE COUPLING WITH END SEAL RING

TECHNICAL FIELD

This invention relates to tube couplings and, in particular, to a beaded tube type coupling with an end seal ring.

DESCRIPTION OF THE PRIOR ART

In various fluid systems, conduits are connected together by suitable so-called tube couplings. In one common type tube coupling, the plug member, such as a beaded tube and its associated socket member are normally sealed by an annular seal ring, such as an O-ring, that is positioned in compressed abutment against opposing annular surfaces of these members and, these members are retained with the plug member fully inserted into the socket member by a nut, loosely encircling the beaded tube outboard of the annular bead, that is threadingly engaged on the external threads of the socket member, the arrangement being such that the outboard end of the socket member engages the inboard end surface of the annular bead to form a secondary metal-to-metal seal. Basic examples of the above-described tube couplings are shown in U.S. Pat. Nos. 3,092,404, entitled "Packed Screw Threaded Gland Type Tube Coupling for Thin Walled Tubing", issued June 4, 1963; to Wallace MacWilliam and 3,393,930 entitled "Coupling for Thin-Walled Tubes" issued July 23, 1968 to F. A. Ziherl et al.

As is well known, when using O-ring seals, there is always the possibility during assembly of this type seal in such tube couplings that the O-ring seal can be occasionally inadvertently cut or otherwise damaged and, accordingly, it is the customary practice to pressure test such tube coupling assemblies. Obviously, if a fluid leak is seen during such pressure test, then the coupling assembly must be first dis-assembled so as to replace the damaged seal, re-assembled and again pressure tested. The latter obviously increases the cost factor in using such tube couplings having one or more ring seals incorporated therein.

SUMMARY OF THE INVENTION

The present invention relates to an improved beaded tube type coupling which includes a tube with a plug member at least at one end thereof and having a raised annular bead adjacent to the free end of the plug member, the tube having a hollow nut with internal threads loosely encircling it outboard of the beaded plug member, a socket member having a stepped bore therein adapted to receive a straight tube portion of the plug member so that its free end is adapted to engage one surface side of the annular bead, the bore including an annulus shaped groove, a seal ring having a U-shaped cross section operatively positioned in the annular shaped groove, the U-shaped cross section of the seal ring being sized so that it is adapted to receive the free end of the plug member, the socket member having external threads to threadingly receive the hollow nut, the arrangement being such that the hollow nut can be rotated relative to the socket to sealing sandwich the annular bead in metal-to-metal sealing relationship therebetween and to compress and expand the seal ring into sealing engagement between the free end of the plug member and against the wall surfaces defining the annulus shaped groove.

Accordingly, a primary object of this invention is to provide an improved tube coupling which uses a ring seal that has a U-shaped cross section, so that, in effect, it is encapsulated in a socket member when engaged and compressed by the free plug end of a tube, it sealingly engages not only the end of the tube but also three surfaces of the socket member.

Another object of this invention is to provide an improved beaded tube coupling with an end seal ring of the above type which includes features of construction, operation and arrangement, rendering it easy and inexpensive to manufacture and assemble.

For a better understanding of the invention, as well as other objects and further features thereof, reference is had to the following detailed description of the invention to be read in connection with the accompanying drawings.

BRIEF DESCRIPTION OF THE DRAWINGS

FIG. 1 is an exploded view of a beaded tube coupling with end seal ring in accordance with a preferred embodiment of the invention, with parts shown in section and other element parts shown partly in elevation;

FIG. 2 is a longitudinal, cross sectional view of the beaded tube coupling of FIG. 1 but with the parts shown fully coupled together;

FIG. 3 is an enlarged view of a portion of the beaded tube coupling of FIGS. 1 and 2, with the end seal ring shown in its as formed configuration; and FIG. 4 is a view of the parts shown in FIG. 3, but with the parts illustrated as being fully coupled together.

DESCRIPTION OF THE PREFERRED EMBODIMENT

Referring now to FIGS. 1 and 2 of the drawings, the beaded tube coupling with end seal ring of the invention includes, as major components thereof, a female socket member or socket 10, a tubular male plug or plug member 12, an end seal ring 14 and a hollow nut 16 used to releasably secure the socket 10, end seal ring 14 and plug member 12 in assembled and sealed relationship to each other, all of these elements or component parts to be described in detail hereinafter.

The socket 10 is adapted to telescopically receive the plug member 12 whereby these members are used to couple two fluid conduits together. These conduits may be for example, tubes, pipes, flexible hoses or conduit passages in machined elements. Thus the socket 10 may be formed as an integral part of a machine element or, as shown, it may be formed as a separate element with a conduit 18 suitably secured thereto.

The plug member 12 may also be formed as a separate element with a conduit suitably secured thereto or, as shown, it is formed as an integral part of a conduit which itself may be a separate element or part of a machine element. Thus as shown, the plug member 12 is formed at one end of the main body portion a tube 12a of a predetermined wall thickness and includes an upstanding annular bead 20 with a tubular pilot portion 21 extending therefrom to the free or plug end of the tube 12a. Preferably, as shown, the free end of the pilot portion is provided with rounded inner and outer peripheral edges 21a and a flat end surface (see FIGS. 3 and 4).

Bead 20, which can be upset or otherwise formed on the tube 12a to a predetermined external diameter, provides on one side thereof an annular radial shoulder 22 facing the pilot portion end 21 of the plug member 12 and, on the other or outboard side, an opposite facing annular radial abutment shoulder 23. In the construction shown, the pilot portion 21 is of reduced external diameter relative to the external diameter of tube 12a. Also, the pilot portion 21 is of a predetermined axial extent between its free end and the point of interconnection with the bead 20 for a purpose to be described.

The hollow nut 16, which may be referred to as a coupling member, is provided with a stepped through bore, which includes, in succession, an internal straight end wall 30 of an internal diameter slightly larger than the external diameter of the tube 12a whereby to loosely encircle tube 12a outboard of the abutment shoulder 23, an intermediate wall 31 and an internally threaded wall 32, the latter two walls 31 and 32 having internal diameters greater than the external diameter of bead 20. Wall 30 is interconnected to wall 31 by a rounded inner chamfer wall 33 and a flat shoulder 34. The rounded inner chamfer wall 33 is configured to correspond to the configuration of the outboard end of bead 20 next adjacent to the main body portion of tube 12a. The hollow nut 16 is also provided with an external wrenching head, such as the hex nut portion 35.

Socket 10, in the embodiment shown is formed as a separate part, with a conduit 18 suitably secured thereto. Thus in the construction illustrated, the outboard end of the socket 10, as best seen in FIG. 2, is provided with a blind annular groove sized to receive one end of the conduit 18, as shown, with these elements then being suitably secured together, as by brazing. Socket 10 is also provided with a stepped bore 40 therethrough.

This bore 40 in socket 10 defines in succession starting from its free end, the left hand end with reference to FIGS. 1 and 2, an internal inclined curved wall 41, a straight intermediate wall 42 of an internal diameter so as to slidably receive the pilot portion 21, and a wall 43 of reduced internal diameter relative to intermediate wall 42 and the internal diameter of the pilot portion 21. Walls 42 and 43 are, in effect, interconnected by a shoulder 44 and by radially spaced apart side walls 45, 46, a base wall 47 and a radial shoulder 48, with these walls 45, 46, 47 and 48 defining an annular groove or socket to receive the end seal ring 14 in a manner to be described.

Referring now to the end seal ring 14, this seal ring 14, made of a suitable elastomeric material and in its as formed configuration as shown in FIG. 3, is in the form of an annulus with an outer annular peripheral surface 50 of an external diameter less than the internal diameter of wall 46; an inner peripheral surface 51; an inboard wall 52; and, an outboard wall 53. This latter outboard wall 53 has an annular pilot tube 21 receiving groove therein defined by a base wall 54 and outwardly inclined spaced apart side walls 55. In its as formed configuration as shown in FIG. 3, the side walls 55 at their outboard ends, the left end with reference to FIG. 3, define an opening large enough to freely receive the free end of the pilot portion 21 but, intermediate the ends of these side wall 55 an interference fit will occur with the free end of the pilot portion 21, shown by the broken lines, as the pilot tube 21 is further moved axially toward base wall 54. Also, as shown in FIG. 3, the material of the seal ring 14 in the area between walls 52 and 54 is adapted to be compressed a predetermined axial distance X.

Socket 10 is of stepped external configuration in the embodiment shown so as to include an externally threaded shank portion 60 for threaded engagement with nut 16 and with an external wrenching head, such as hex head 61. Also, as shown, the axial extent between the wall 47 and the free end of the tapered end wall 41 of the socket 10 is preselected relative to the axial extent of the pilot tube 21 and wall 22 of bead 20 so that when the pilot tube 21 is fully inserted into the socket 10 and the nut 16 is torqued onto the threads of the threaded shank portion, the seal ring 14 will be compressed so as to sealingly engage the walls 45-47 of the socket 10 and the end and internal and external end portions of the pilot tube 21 as shown in FIG. 4. Also as shown in this Figure, the tapered end wall 41 of the socket 10 will define a metal-to-metal seal with the shoulder 22 of the annular bead 22 of the plug member 12.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A beaded tube type coupling including a tube with a plug member at least at one end thereof, said plug member having a free end and having a raised annular bead adjacent to the free end of the plug member, a straight tube portion extending between said free end and annular bead, a hollow nut with internal threads loosely encircling said tube outboard of the beaded plug member, a socket member having a free end and a stepped bore extending inwardly thereupon adapted to receive said straight tube portion of the plug member so that its free end is adapted to sealingly engage one surface side of the annular bead, said bore including an annular shaped groove defined by wall surfaces of said socket member, a seal ring having a U-shaped cross section operatively positioned in said groove, the U-shaped cross section of the seal ring being sized so that it is adapted to receive the free end of said plug member, said socket member having external threads to threadingly receive the hollow nut, the arrangement being such that the hollow nut is rotatable relative to the socket to sealing sandwich the annular bead in metal-to-metal sealing relationship therebetween and to compress and expand the seal ring into sealing engagement between the free end of the plug member and against the wall surfaces defining the annular shaped groove.

2. A beaded tube type coupling including a tube with a plug member at least at one end thereof, said plug member having a free end with a radial end surface and having a raised annular bead adjacent to the free end of the plug member, a straight tube portion extending between said free end and annular bead, a hollow nut with internal threads loosely encircling it outboard of the beaded plug member, a socket member having a free end and a stepped bore extending inwardly therefrom adapted to receive said straight tube portion of the plug member so that its free end is adapted to sealingly engage one surface side of the annular bead, said bore including an annular shaped groove defined by three orthogonal wall surfaces, a seal ring having a U-shaped cross section operatively positioned in said groove, the U-shaped cross section of the seal ring having two converging side wall surfaces sized so that it is adapted to receive the free end of said plug member in radial interference relationship, said socket member having external threads to threadingly receive the hollow nut, the arrangement being such that the hollow nut is rotatable relative to the socket to sealing sandwich the annular bead in metal-to-metal sealing relationship therebetween and to compress and expand the seal ring into sealing engagement between the free end of the plug member at said radial end surface and inner and outer diameter wall surfaces thereof and against all three wall surfaces defining the annular shaped groove.

* * * * *